United States Patent
Kadirvel, III et al.

(10) Patent No.: US 9,209,632 B2
(45) Date of Patent: Dec. 8, 2015

(54) SYSTEMS AND METHODS OF DIRECT CELL ATTACHMENT FOR BATTERIES

(71) Applicant: Texas Instruments Incorporated, Dallas, TX (US)

(72) Inventors: Karthik Kadirvel, III, Melbourne, FL (US); Steve Harrell, Melbourne, FL (US); Brian Lum-Shue-Chan, Palm Bay, FL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 185 days.

(21) Appl. No.: 13/898,259

(22) Filed: May 20, 2013

(65) Prior Publication Data

US 2014/0029147 A1   Jan. 30, 2014

Related U.S. Application Data

(66) Substitute for application No. 61/675,617, filed on Jul. 25, 2012.

(51) Int. Cl.
  *H02J 7/00*   (2006.01)

(52) U.S. Cl.
  CPC ............ *H02J 7/0031* (2013.01); *H02J 7/0034* (2013.01); *H02J 2007/0037* (2013.01); *H02J 2007/0039* (2013.01)

(58) Field of Classification Search
  CPC ... H02J 7/00; H02J 7/0031; H02J 2007/0031; H02J 2007/0037; H02J 2007/0039; H02J 2007/004; H02H 3/08; H02H 3/087; H02H 3/202; H02H 3/207
  USPC .......................................................... 361/87
  See application file for complete search history.

(56) References Cited

U.S. PATENT DOCUMENTS

| | | | | |
|---|---|---|---|---|
| 2007/0190369 | A1* | 8/2007 | Leach et al. | 429/9 |
| 2013/0099846 | A1* | 4/2013 | Sohma | 327/333 |

FOREIGN PATENT DOCUMENTS

WO   WO2012026537  A1 *  3/2012

OTHER PUBLICATIONS

English Machine translation of WO2012026537A1, Yamaguchi et al., Power Supply Device, Mar. 1, 2012.*

\* cited by examiner

*Primary Examiner* — Thienvu Tran
*Assistant Examiner* — Kevin J Comber
(74) *Attorney, Agent, or Firm* — William B. Kempler; Frank D. Cimino

(57) ABSTRACT

Embodiments of the systems and methods of direct cell attachment for battery cells disclosed herein operate without the protection FETs and the protection IC, thereby enabling the direct attachment of battery cells to the system without compromising safety. A charger IC comprises a switching regulator whose output is used to charge the battery through a pass device. In example embodiments of the disclosed systems and methods of direct cell attachment, a combination of switching FETs and the pass device are used as a protection device instead of the charge and discharge FETs. During normal operation, the pass device may be used to charge the battery using the traditional battery charging profile. Under fault condition, the switching FETs and pass device may be driven appropriately to protect the system.

12 Claims, 4 Drawing Sheets

SYSTEMS AND METHODS OF DIRECT CELL ATTACHMENT FOR BATTERIES

CROSS-REFERENCE TO RELATED APPLICATION

This application claims benefit to U.S. provisional patent application Ser. No. 61/675,617, filed on Jul. 25, 2012, which is incorporated by reference herein.

TECHNICAL FIELD

The present disclosure is generally related to batteries and, more particularly, is related to battery pack protection.

BACKGROUND

Lithium-ion (Li-ion) has become the dominant rechargeable battery chemistry for consumer electronics devices such as smart phones and notebook computers and is poised to become commonplace for industrial, transportation, and power-storage applications. Li-ion battery chemistry is different from other rechargeable battery chemistries such as nickel metal hydride [NiMH], nickel cadmium [NiCad], and lead acid in a number of ways. From a technological standpoint, because of high energy density, Li-ion technology has enabled entire families of portable devices, such as smart phones. From a safety standpoint, a high energy density coupled with a flammable organic, rather than traditional aqueous electrolyte, has created a number of protection challenges. Specific challenges include the design of batteries containing Li-ion cells, and the storage and handling of these batteries.

An individual Li-ion cell will have a safe voltage range over which it can be cycled that will be determined by the specific cell chemistry. A safe voltage range will be a range in which the cell electrodes will not rapidly degrade due to lithium plating, copper dissolution, or other undesirable reactions. For most cells, charging significantly above 100% state of charge (SOC) can lead to rapid, exothermic degradation of the electrodes. Charging above the manufacturer's high voltage specification is referred to as overcharge. Since overcharging can lead to violent thermal runaway reactions, a number of overcharge protection devices are either designed into the cells or included in the electronics protection packages for Li-ion battery packs.

A Li-ion battery (or battery pack) is made from one or more individual cells packaged together with their associated protection electronics. By connecting cells in parallel, designers increase pack capacity. By connecting cells in series, pack voltage is increased.

Often, energetic failures lead to thermal runaway. Cell thermal runaway refers to rapid self-heating of a cell derived from the exothermic chemical reaction of the highly oxidizing positive electrode and the highly reducing negative electrode; it can occur with batteries of almost any chemistry.

If overheated or overcharged, Li-ion batteries may suffer thermal runaway and cell rupture. In extreme cases this can lead to combustion. Deep discharge may short-circuit the cell, in which case recharging would be unsafe. To reduce these risks, Lithium-ion battery packs contain fail-safe circuitry that shuts down the battery when its voltage is outside the safe range of 3-4.2 V per cell. When stored for long periods the small current draw of the protection circuitry itself may drain the battery below its shut down voltage; normal chargers are then ineffective. Many types of lithium-ion cell cannot be charged safely below 0° C.

A major component of a battery pack along is the battery management circuitry. Typically a battery management unit (BMU) consists of a charger and a fuel gauge (FIG. 1). The lithium ion battery pack itself consists of a lithium ion cell, a protection IC and protection FETs (charge (CHG) and discharge (DSG)). Protection circuits occupy useful space inside the cells, add additional points of failure and irreversibly disable the cell when activated. They are required because the anode produces heat during use, while the cathode may produce oxygen. These devices and improved electrode designs reduce/eliminate the risk of fire or explosion. Further, these features increase costs compared to nickel metal hydride batteries, which require only a hydrogen/oxygen recombination device (preventing damage due to mild overcharging) and a back-up pressure valve.

The function of the protection IC is to open the protection switches and detach the lithium ion battery pack from the system when the lithium ion cell voltage or current crosses critical safety thresholds. The various critical thresholds include over current during charge, over current during discharge, over voltage during charge, under voltage during discharge, short circuit during discharge, over temperature, and reverse current.

Some systems now use a non-removable pack. However, conventional pack-side protection is still typically used. This imposes some circuit redundancies and mechanical limitations. The protection FETs and the protection ICs add considerable cost to the battery pack. Furthermore, the PCB for the protection FET and ICs increases the weight, size, assembly time, and test time. There are heretofore unaddressed needs with these previous solutions.

SUMMARY

Example embodiments of the present disclosure provide systems of direct cell attachment for batteries. Briefly described, in architecture, one example embodiment of the system, among others, can be implemented as follows: a battery protection circuit comprising: a battery transistor configured in series between a charging source and a battery, the battery transistor also configured in series between a load and the battery, the battery transistor further configured to charge the battery under normal conditions, and configured to protect the load during fault conditions, the battery transistor further configured outside of a pack that houses the battery.

Embodiments of the present disclosure can also be viewed as providing methods for direct cell attachment for batteries. In this regard, one embodiment of such a method, among others, can be broadly summarized by the following steps: determining a fault condition for a battery pack; and protecting the battery with a battery transistor external to the battery pack, the transistor connected in series between the battery pack and a charger.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples. Although the transistors of the figures are provided as field effect transistors (FETs), other transistors may be used depending on the application. Additionally, although the FETs in the figures are provided as n-channel FETs, p-channel FETs may also be utilized depending on the application.

Figure 1:
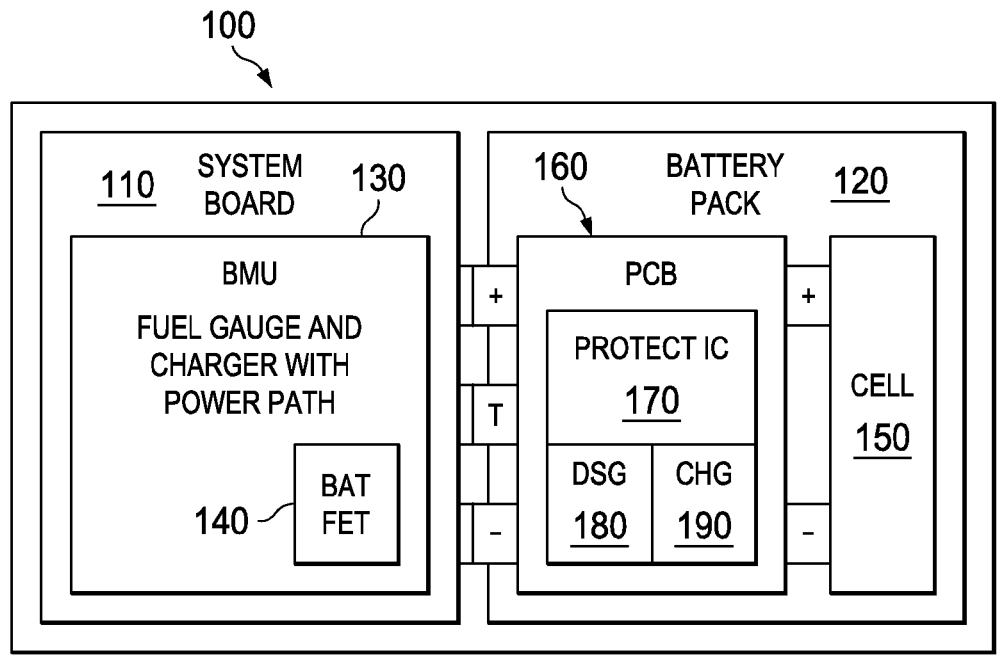
FIG. 1 is a system block diagram of an example embodiment of a prior art battery protection circuit.

Circuit 100 of FIG. 1 provides an example of the current state of the art. Battery pack 120 includes cell 150 and printed circuit board (PCB) 160 with protection IC 170, charge transistor 180 and discharge transistor 190. Charge transistor 180 and discharge transistor 190 are in line with cell 150. Battery management unit (BMU) 130 resides on system board 110 external to battery pack 120. BMU 130 includes a fuel gauge and a charger circuit with battery transistor 140. The fuel gauge of BMU 130 determines the remaining lifetime of battery pack 120 and the charger charges battery pack 120. PCB 160, which is inside battery pack 120, and BMU 130 are separate.

Figure 2:
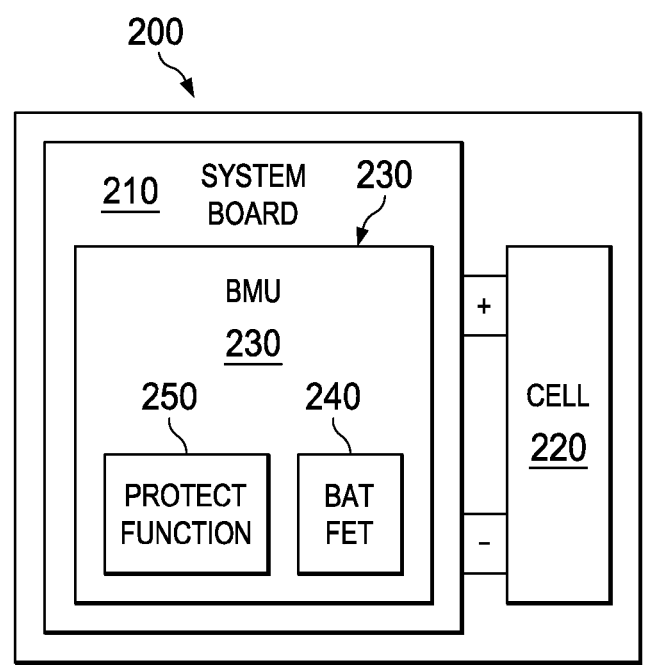
FIG. 2 is a system block diagram of an example embodiment of a system of direct cell attachment for batteries.

FIG. 2 provides an example embodiment of the disclosed system of direct cell attachment for batteries. Circuit 200 includes battery cell 220 and system board 210. System board 210, which includes BMU 230, battery transistor 240, and protection function 250 is external to cell 220 (cell 220 may be embodied by a cell pack with multiple cells). The PCB with the protection IC and the charge and discharge transistors have been removed from the battery pack. The disclosed systems and methods may be used for any battery operated system and on any battery chemistry that has safety issues. The pack-side gauge in which the protection is on the pack itself and the whole PCB section from the battery pack (the protection IC, the discharge FET and charge FET) is pulled into the BMU.

Embodiments of the systems and methods of direct cell attachment for batteries disclosed herein operate without the protection FETs and the protection IC, thereby enabling the direct attachment of lithium ion cells to the system, as provided in FIG. 2, without compromising safety. A charger IC, as provided in FIG. 3, comprises a switching regulator whose output (SYS) is used to charge the battery (BAT) through a pass device (BAT FET).

In example embodiments of the disclosed systems and methods of direct cell attachment, a combination of transistors (switching and/or linear devices) and a pass device (BAT FET) are used as a protection device instead of the charge and discharge FETs. During normal operation, the pass device may be used to charge the battery using the traditional Li-ion charging profile. Under fault conditions, the transistors and pass device may be driven appropriately to protect the system. Table 1 lists various fault conditions and compares the action to be take on the various FETs in the current solution and proposed solution.

TABLE 1

| Fault Condition | Current Solution | Example Embodiment |
|---|---|---|
| Over current during charge (OCC) | Turn off charge FET | Turn off transistors and BAT FET |
| Over current during discharge (OCD) | Turn off discharge FET | Turn off BAT FET |
| Over voltage during charge (OV) | Turn off charge FET | Turn off transistors and BAT FET |
| Under voltage during discharge (UV) | Turn off discharge FET | Turn off BAT FET |
| Short circuit during discharge (SCD) | Turn off discharge FET | Turn off BAT FET |
| Over temperature | Turn off CHG and DSG FET | Turn off transistors and BAT FET |
| Reverse voltage (i.e BAT to source) | Back to back body diodes for CHG and DSG FETs | Blocking FET along with high side FET of switching regulator form a pair of back to back diodes |

By removing the circuitry from the battery pack, battery pack cost may be reduced as the printed circuit board (PCB), the protection IC, and the protection FET are removed. Battery pack weight may also be reduced considerably. Battery pack size may be reduced. Since there is no PCB in the battery pack, the pack may be reshaped. Series resistance of the charge/discharge path may be reduced. System efficiency may be increased as the power loss across the protection FETs and contact resistance is removed. Heat generated across the protection FETs and contact resistance may be reduced, which increases battery life. Full redundant protection may be achieved for safety thresholds in systems that already have a protector. Second level protection may be achieved for systems that already have a protector.

In applications in which protection is present in the pack, battery management unit safety thresholds may be set higher than the in-pack protector thereby providing increased efficiency during over current during charge (OCC) and over voltage (OV) fault conditions. In traditional protectors, during OCC and OV, discharge from the battery is allowed through the body diode of the pass device, which is inefficient due to the higher resistance in the diode and the loss of voltage across the diode. In example embodiments of the disclosed systems and methods, the BAT FET may be turned ON which reduces the resistance and the voltage drop.

Figure 3:
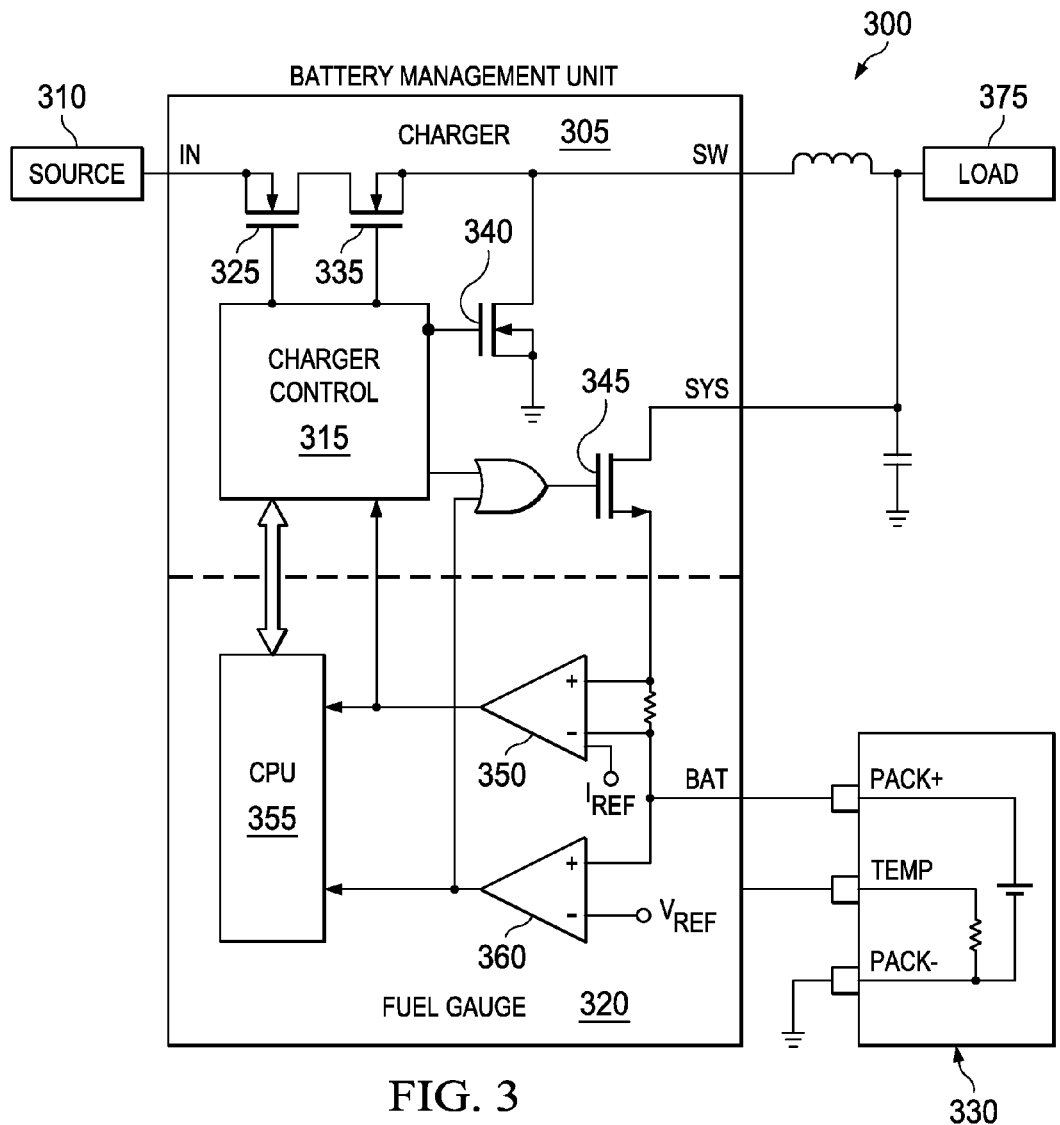
FIG. 3 is a circuit diagram of an example embodiment of the system of FIG. 2.

FIG. 3 provides an example embodiment of battery management unit circuit 300, including input source 310, charger circuit 305, fuel gauge 320, battery pack 330 and load 375. Charger circuit 305 includes charger controller 315, blocking transistor 325, switching transistors 335 and 340, and pass device or battery transistor 345. An example embodiment of fuel gauge 320 includes processing unit 355, current comparator 350 and voltage comparator 360. Input source 310 (such as a wall wart) charges battery pack 330 through blocking transistor 325, switching transistor 335 and battery transistor 345.

Figure 4:
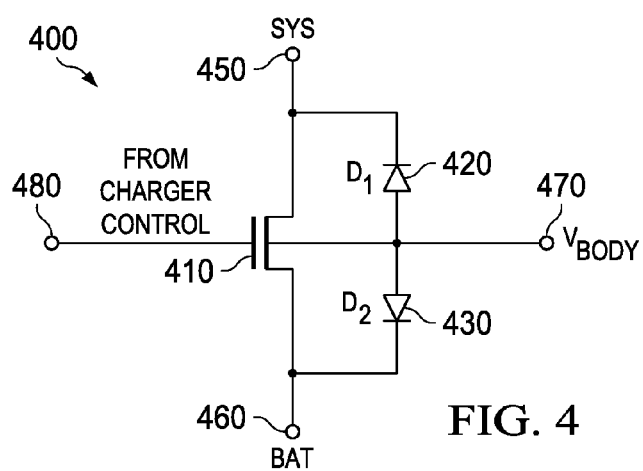
FIG. 4 is a circuit diagram of an example embodiment of the battery transistor of FIG. 3.
Figure 5:
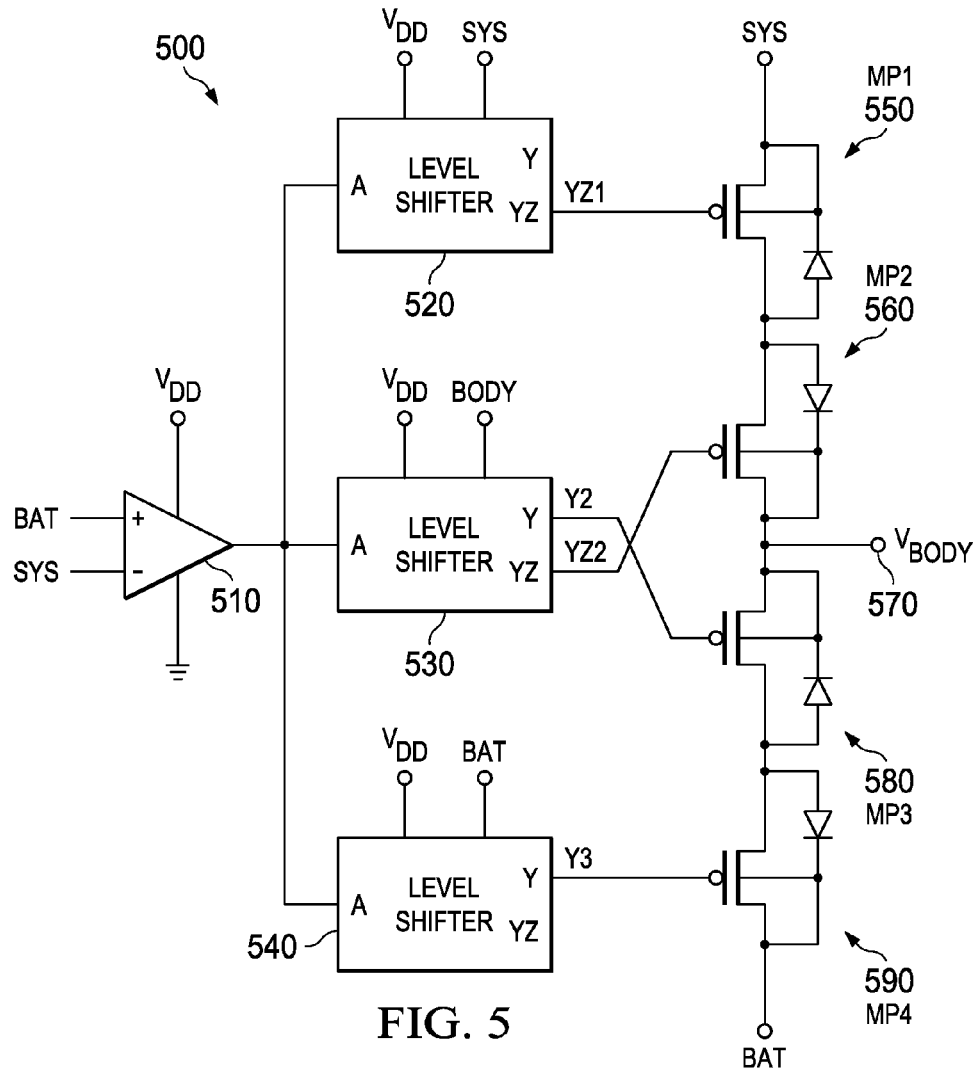
FIG. 5 is a circuit diagram of an example embodiment of a back gate control circuit for the transistor of FIG. 4.

To protect the system against various safety conditions such as those listed in Table 1, an example embodiment of the disclosed system of direct cell attachment for batteries uses a single nFET for the pass device, as provided in FIG. 4, with special control circuitry. The special circuitry may drive the back gate of the nFET such that the body diode does not turn on. FIG. 5 provides an example embodiment of one implementation of such a circuit.

An example embodiment of the connection of the body diode for the various fault cases is provided in Table 2.

TABLE 2

| Fault Condition | Solution | Body diode connection |
|---|---|---|
| Over current during charge (OCC) | Turn off switching FETs | BAT ($D_1$ = Reverse biased, $D_2$ = off with 0 V) |
| Over current during discharge(OCD) | Turn off BAT FET | SYS ($D_1$ = off with 0 V, $D_2$ = reverse biased) |
| Over voltage during charge (OV) | Turn off switching FETs | BAT ($D_1$ = Reverse biased, $D_2$ = off with 0 V) |
| Under voltage during discharge (UV) | Turn off BAT FET | SYS ($D_1$ = off with 0 V, $D_2$ = reverse biased) |
| Short circuit during discharge (SCD) | Turn off BAT FET | SYS ($D_1$ = off with 0 V, $D_2$ = reverse biased) |
| Over temperature (OT) | Turn off switching FETs and BAT FET | SYS ($D_1$ = off with 0 V, $D_2$ = reverse biased) |
| Reverse current (i.e BAT to source) | Back to back body diodes for CHG and DSG FETs | Blocking FET along with high side FET of switching regulator does the reverse blocking. VBODY is connected to BAT under normal operation |

FIG. 4 provides a schematic of battery transistor 410 (such as an isolated nFET) with gate, drain, source, and body, connected to the charger control 480, system voltage terminal (SYS) 450, battery terminal (BAT) 460, and output of back gate (VBODY) 470 respectively. Diodes D1 420 and D2 430 are inherent in the nFET.

Recovery from fault conditions for each of the cases may differ. In an over current fault condition during charge, body diode node 470 is connected to battery terminal 460 where D1 420 is reverse biased and D2 430 is off with zero (0) volts. When the over current condition is stopped, battery transistor 410 is turned on as part of recovery to allow charging. The body diode continues to be connected to battery terminal 460.

In an over current fault condition during discharge, body diode node 470 is connected to system voltage terminal 450 where D1 420 is off with zero (0) volts and D2 430 is reverse biased. When the over current discharge situation is removed, the system voltage is eventually regulated. As soon as the system voltage is regulated, the lowest potential in the system becomes the battery voltage. Body diode node 470 is now connected to the battery and normal charging and discharging can be completed.

In an over voltage fault condition during charge, body diode node 470 is connected to battery voltage 460 where D1 420 is reversed biased and D2 430 is off with zero (0) volts. For recovery, battery transistor 410 is turned off. If the charger is connected to node 480, then the switching FETs directly power the load.

In an under voltage fault condition during discharge, body diode node 470 is connected to the system voltage terminal 450 where D1 420 is off with zero (0) volts and D2 430 is reverse biased. For recovery, the system looks for the charger attachment at node 480. Then the system voltage will come up and start charging the battery.

In a short circuit fault condition during discharge, body diode node 470 is connected to system voltage terminal 450 where D1 420 is off with zero (0) volts and D2 430 is reverse biased. For recovery, battery terminal 460 is disconnected and system voltage terminal 450 is monitored. Once the external load is removed, the battery may be reconnected. If necessary, the device may be programmed to wait for a charger attachment before connecting the battery to the load.

In an over-temperature fault condition, body diode node 470 is connected to system voltage terminal 450 during the fault where D1 420 is off with zero (0) volts and D2 430 is reversed biased. For recovery, temperature is monitored. When temperature drops, body diode node 470 is connected to battery terminal 460 to resume normal operation.

In a reverse current fault condition, where the terminals of the battery are reversed, the blocking FET along with the high side FET of the switching regulator performs the reverse current blocking function. Body diode node 470 is connected to battery terminal 460 under normal operation. There is no change from normal operation during the recovery period.

Referring now to FIG. 5, to prevent the body diode from turning on, back gate control circuit 500 drives $V_{BODY}$ node 578 of the nFET to the lower value of the system and battery voltage. This is done by first comparing the battery voltage to the system voltage using comparator 510 to generate a logic signal. The power supply for comparator 510 may be generated from an internally regulated rail.

The output of the logic signal may be used to drive switches 550 and 560 to connect the system voltage or the battery voltage to the $V_{BODY}$ node. Switches 560 and 580 may be used to prevent the body diodes of switches 550 and 590 from turning on. Switches 550 and 560 form a pair of back to back diodes. Level shifters 520, 530, and 540 may be used to convert the logic signal to the appropriate potential to drive the switches. The truth table for an example embodiment of back gate control circuit 500 is provided in Table 3.

TABLE 3

| Condition | Comp output | YZ1 | Y2 | YZ2 | Y3 | MP1 | MP2 | MP3 | MP4 | VBODY |
|---|---|---|---|---|---|---|---|---|---|---|
| BAT > SYS | High | L | H | L | H | ON | ON | OFF | OFF | SYS |
| SYS > BAT | Low | H | L | H | L | OFF | OFF | ON | ON | BAT |

Figure 6:
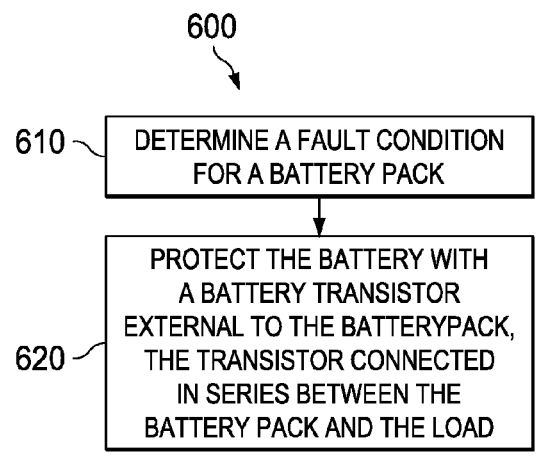
FIG. 6 is a flow diagram of a method of direct cell attachment for batteries.

FIG. 6 provides flowchart 600 of an example embodiment of a method of direct cell attachment for batteries. In block 610, a fault condition for a battery pack is determined. In block 620, the battery pack is protected with a battery transistor external to the battery pack, the battery transistor connected in series between the battery pack and the load.

Figure 7:
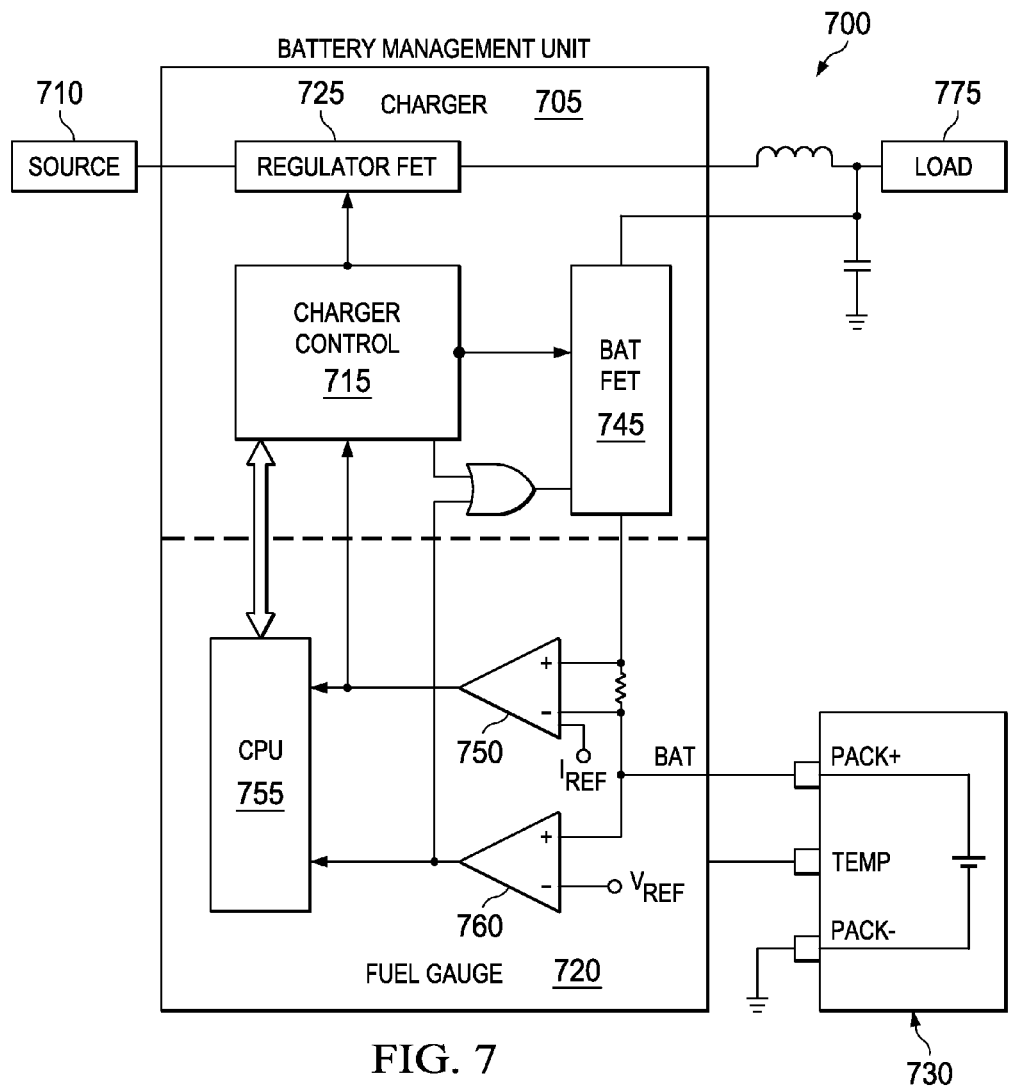
FIG. 7 is a system block diagram of an example embodiment of a system of direct cell attachment for batteries.

FIG. 7 provides an alternative embodiment of a system of direct cell attachment for batteries with battery management unit circuit 700, including input source 710, charger circuit 705, fuel gauge 720, battery pack 730 and load 775. Charger circuit 705 includes charger controller 715, regulator transistor 725 and pass device or battery transistor 745. An example embodiment of fuel gauge 720 includes processing unit 755, current comparator 750 and voltage comparator 760. Input source 710 (such as a wall wart) charges battery pack 730 through regulator transistor 725 and battery transistor 745. In an example embodiment, regulator transistor 725 comprises a switching FET with or without a reverse blocking FET. In an alternative embodiment, regulator transistor 725 comprises a linear transistor with or without a reverse blocking FET. In an example embodiment, battery transistor 745 comprises a single FET with back gate control. In an alternative embodiment, battery transistor 745 comprises two FETs in a back to back configuration.

Although the present invention has been described in detail, it should be understood that various changes, substi- Therefore, at least the following is claimed:

1. A system comprising:
    a battery protection circuit comprising:
    a battery transistor configured in series between a charging source and a battery, the battery transistor also configured in series between a load and the battery, the battery transistor further configured to charge the battery under normal conditions, and configured to protect the load during fault conditions, the battery transistor further configured outside of a pack that houses the battery, wherein the battery transistor comprises a single n-channel field effect transistor (nFET), a back gate of the nFET driven with a control circuit such that an associated body diode is not turned on and wherein the control circuit comprises at least one comparator, a plurality of level shifters and a plurality of switches, the comparator, the plurality of level shifters and the plurality of switches configured to apply the lower of the battery voltage and the system voltage to the body node of the nFET.

2. The system of claim 1, wherein the battery transistor comprises two n-channel field effect transistors (FETs) or two p-channel FETs.

3. The system of claim 1, wherein a battery management unit is configured to control the battery transistor and at least one regulator transistor to protect the battery, the at least one regulator transistor configured in series between the charging source and the load.

4. The system of claim 3, wherein
    in an overcurrent condition during charging, the at least one regulator transistor is turned OFF;
    in an overcurrent condition during discharge, the battery transistor is turned OFF;
    in an overvoltage condition during charging, the at least one regulator transistor is turned OFF;
    in an undervoltage condition during discharge, the battery transistor is turned OFF;
    in a short circuit condition during discharge, the battery transistor is turned OFF; and
    in an over temperature condition, the at least one regulator transistor and the battery transistor are turned OFF.

5. The system of claim 1, further comprising a blocking transistor configured in series between the source and the at least one regulator transistor, the blocking transistor and the at least one regulator transistor configured to form a pair of back to back diodes to block a reverse current condition.

6. A method comprising:
    determining a fault condition for a battery pack;
    protecting the battery with a battery transistor external to the battery pack, the battery transistor connected in series between the battery pack and a charger, wherein the battery transistor comprises an n-channel field effect transistor (nFET); and
    driving a back gate of the nFET with the lower of a load voltage and a battery voltage to prevent a body diode of the nFET from turning on.

7. The method of claim 6, further comprising blocking a reverse current condition with a blocking transistor connected in series between a load and an input source.

8. The method of claim 6, wherein in an over current condition during charge, connecting the back gate of the nFET to the battery voltage;
    in an over current condition during discharge, further comprising connecting the body diode to the load voltage;
    in an over voltage condition during charge, further comprising connecting the body diode to the battery voltage;
    in an under voltage condition during discharge, further comprising connecting the body diode to the load voltage;
    in a short circuit condition during discharge further comprising connecting the body diode to the load voltage;
    in an over temperature condition, further comprising connecting the body diode to the load voltage; and
    in a reverse current condition, further comprising connecting the body diode to the battery voltage.

9. The method of claim 6, wherein the lower of the load voltage and the battery voltage is generated by comparing the load voltage and the battery voltage, and generating a level shifted signal to drive a plurality of transistors.

10. The method of claim 6, further comprising charging the battery through the battery transistor.

11. A system, comprising:
    a battery management unit comprising:
    a charger module comprising:
    a charger controller;
    at least one regulator transistor; and
    a battery transistor configured to provide fault protection for a battery, wherein the battery transistor comprises a single n-channel field effect transistor (nFET), a back gate of the nFET driven with a control circuit such that an associated body diode is not turned on, and wherein the control circuit comprises at least one comparator, a plurality of level shifters and a plurality of switches, the comparator, the plurality of level shifters and the plurality of switches configured to apply the lower of the battery voltage and the system voltage to the body node of the nFET; and
    a fuel gauge module configured to provide fault information to the charger module, the fuel gauge module comprising:
    a processing unit;
    a voltage comparator; and
    a current comparator.

12. The system of claim 11, wherein
    in an overcurrent condition during charging, the at least one regulator transistor and the battery transistor is turned OFF;
    in an overcurrent condition during discharge, the battery transistor is turned OFF;
    in an overvoltage condition during charging, the at least one regulator transistor and the battery transistor is turned OFF;
    in an undervoltage condition during discharge, the battery transistor is turned OFF;
    in a short circuit condition during discharge, the battery transistor is turned OFF; and
    in an over temperature condition, the at least one regulator transistor and the battery transistor are turned OFF.

* * * * *